(12) United States Patent
Matsubara et al.

(10) Patent No.: US 6,716,138 B2
(45) Date of Patent: Apr. 6, 2004

(54) OIL PUMP CONTROL DEVICE FOR AUTOMATIC TRANSMISSION AND CONTROL METHOD OF THE SAME

(75) Inventors: Tooru Matsubara, Toyota (JP); Yasuo Hojo, Nagoya (JP); Hideo Tomomatsu, Nagoya (JP); Yoshikazu Tanaka, Toyota (JP); Tadasu Tomohiro, Toyota (JP); Katsumi Nakatani, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/156,938

(22) Filed: May 30, 2002

(65) Prior Publication Data

US 2002/0193206 A1 Dec. 19, 2002

(30) Foreign Application Priority Data

Jun. 14, 2001 (JP) ........................ 2001-180657

(51) Int. Cl.$^7$ ............................................. B60K 41/02
(52) U.S. Cl. ....................................... 477/167; 477/180
(58) Field of Search ................................. 477/157, 159, 477/167, 180

(56) References Cited

U.S. PATENT DOCUMENTS

| | | | | |
|---|---|---|---|---|
| 5,944,632 A | * | 8/1999 | Hara et al. ................... | 477/156 |
| 6,258,008 B1 | * | 7/2001 | Tabata et al. ................ | 477/107 |
| 6,269,895 B1 | * | 8/2001 | Tanuguchi et al. .......... | 180/65.2 |
| 6,390,947 B1 | * | 5/2002 | Aoki et al. ..................... | 477/3 |
| 6,401,012 B1 | * | 6/2002 | Aoki et al. ..................... | 701/54 |
| 6,460,500 B1 | * | 10/2002 | Ooyama et al. .......... | 123/179.3 |
| 6,463,375 B2 | * | 10/2002 | Matsubara et al. .......... | 477/180 |
| 2001/0018903 A1 | * | 9/2001 | Hirose et al. .............. | 123/179.4 |
| 2002/0019691 A1 | * | 2/2002 | Matsubara et al. ............ | 701/51 |
| 2002/0107632 A1 | * | 8/2002 | Fuse et al. ................... | 701/112 |
| 2002/0193930 A1 | * | 12/2002 | Matsubara et al. ............ | 701/51 |

FOREIGN PATENT DOCUMENTS

| | | |
|---|---|---|
| JP | 5-263913 | 10/1993 |
| JP | 6-265004 | 9/1994 |
| JP | A 8-14076 | 1/1996 |
| JP | 8-004888 | 1/1996 |
| JP | 8-254262 | 10/1996 |
| JP | 9-71138 | 3/1997 |
| JP | A 10-324177 | 12/1998 |
| JP | A 2000-35122 | 2/2000 |

OTHER PUBLICATIONS

Tomomatsu et al., "Automatic Transmission Control System Developed for Toyota Mild Hybrid System (THS–M)", SAE Technical Paper Series, pp. 1–6, 2002.

* cited by examiner

*Primary Examiner*—Saul Rodriguez
*Assistant Examiner*—Dennis Abdelnour
(74) *Attorney, Agent, or Firm*—Oliff & Berridge, PLC

(57) ABSTRACT

A condition for driving an electric oil pump is set. A turbine speed or an input speed of an automatic transmission is measured. A correction amount for a hydraulic pressure is calculated on the basis of the turbine speed obtained by reference to a relation between the turbine speed and hydraulic pressure, and a correction amount for a drive duty ratio of the electric oil pump which is required for generation of the corrected hydraulic pressure is calculated. The procedure is resumed after the procedure has been performed. The condition for driving the electric oil pump is updated on the basis of the correction amount for the drive duty ratio calculated.

13 Claims, 5 Drawing Sheets

OIL PUMP CONTROL DEVICE FOR AUTOMATIC TRANSMISSION AND CONTROL METHOD OF THE SAME

The disclosure of Japanese Patent Application No. 2001-180657 filed on Jun. 14, 2001 including the specification, drawings and abstract is incorporated herein by reference in its entirety.

BACKGROUND OF THE INVENTION

1. Field of Invention

The invention relates to an oil pump control device and method for an automatic transmission. In particular, the invention relates to a control device for an electric oil pump disposed in an automatic stop/restart-type engine vehicle in which an engine is stopped automatically upon fulfillment of one of a predetermined number of running conditions of the vehicle, namely, a so-called economy-running vehicle.

2. Description of Related Art

A vehicle having an engine that is stopped automatically upon fulfillment of one of a predetermined number of running conditions of the vehicle and that is restarted automatically for takeoff by a certain operation performed by a driver, such as a depression of an accelerator pedal, has been known for a long time as a so-called economy-running vehicle. In the case where an automatic transmission is adopted in such an automatic stop/restart-type engine vehicle, a mechanical oil pump driven by an engine ensures a hydraulic pressure for operating a friction coupling element and a change-gear mechanism in the automatic transmission. If the engine is stopped automatically upon fulfillment of one of a predetermined number of running conditions of the vehicle, the mechanical oil pump driven by the engine is stopped as well. For this reason it becomes impossible to ensure a hydraulic pressure for operating the friction coupling element and the change-gear mechanism in the automatic transmission when the engine is restarted. In quest of a solution to this problem, Japanese Patent Application Laid-Open No. 10-324177 discloses the idea of additionally providing an electric oil pump that is electrically driven to supply an automatic transmission with a hydraulic pressure.

FIG. 5 is an exemplary diagram showing how an electric oil pump is arranged in relation to the other component members of a so-called economy-running vehicle according to the related art. An output torque of an engine 1 is input to an automatic transmission 3 via a torque converter 2 and output to an output shaft 4 of the vehicle. An electric oil pump 6 is disposed in parallel with a mechanical oil pump 5 driven by the engine 1. An output from the electric oil pump 6 is coupled with an output from the mechanical oil pump 5 via a check valve 7 and then transmitted to the automatic transmission 3. The electric oil pump 6 is supplied with electric power from a battery 8 via a driver circuit 9, which is connected to an oil pump control device 10.

It will now be described how the construction described above operates. When the engine 1 is running, an output torque of the engine 1 is output to the output shaft 4 via the torque converter 2 and the automatic transmission 3 and drives the mechanical oil pump 5 at the same time. A hydraulic pressure generated at this moment is transmitted through a hydraulic circuit and suitably controlled by hydraulic pressure control device (not shown). The hydraulic pressure thus controlled is supplied to the automatic transmission 3. On the other hand, if the engine 1 is stopped automatically and enters an economy-running state, the mechanical oil pump 5 stops operating and no longer generates a hydraulic pressure. In this case, the oil pump control device 10 transmits a drive signal for controlling an operation of the electric oil pump 6 to the driver circuit 9, and electric power in the battery 8 is then supplied to the electric oil pump 6 via the driver circuit 9, whereby the electric oil pump 6 is operated and generates a hydraulic pressure. This hydraulic pressure is transmitted through the hydraulic circuit via the check valve 7, suitably controlled by the hydraulic pressure control device (not shown), and supplied to the automatic transmission 3. The check valve 7 prevents a high hydraulic pressure in the mechanical oil pump 5 from being transmitted reversely to the electric oil pump 6.

As described hereto, it is not the mechanical oil pump 5 but the electric oil pump 6 that operates when the engine 1 is out of operation. The electric oil pump 6 thus ensures a hydraulic pressure for operating the change-gear mechanism and the friction coupling element. As a result, the engine 1 can be restarted appropriately.

In the aforementioned related art, the electric oil pump is in operation when the mechanical oil pump is out of operation during stoppage of the engine. The electric oil pump generates a hydraulic pressure which ensures operation of the friction coupling element and the change-gear mechanism, whereby the engine can be restarted appropriately. However, the hydraulic pressure output from the electric oil pump must be set much higher than an optimal output hydraulic pressure, in consideration of differences or aging-based changes in the performance of a motor for driving the electric oil pump, the output voltage of the driver circuit, the clearance of valves disposed in the automatic transmission or the hydraulic pressure controller thereof, and the like. For this reason, problems such as a shortened period of endurance of the motor and a deterioration in fuel consumption resulting from an increase in power consumption in an economy-running state are caused. A solution to these problems requires controlling the output hydraulic pressure on the basis of a result obtained by monitoring the optimal output hydraulic pressure. However, it is not appropriate to merely monitor the hydraulic pressure in the electric oil pump. That is, the output hydraulic pressure needs to be controlled on the basis of a result obtained by monitoring the optimal output hydraulic pressure in such a manner that a shock occurring in the change-gear mechanism during the coupling of the friction coupling element, such as the axle clutch, does no harm to the driveability of the vehicle.

SUMMARY OF THE INVENTION

The invention thus provides an oil pump control device for an automatic transmission which offers an adequate solution to the problems caused in the control device for the electric oil pump according to the related art and which ensures an optimal hydraulic pressure output from the electric oil pump from the standpoint of operating a friction coupling element and a change-gear mechanism.

In order to achieve the objective stated above, an oil pump control device for an automatic transmission according to one aspect of the invention comprises an electric oil pump that is electrically driven to supply the automatic transmission with a hydraulic pressure, and a controller that updates the hydraulic pressure generated by the electric oil pump on the basis of kinetic characteristics of a torque transmission system during a start of an engine that is stopped automatically upon fulfillment of one of a predetermined number of running conditions of a vehicle and optimizing a hydraulic pressure supplied to the automatic transmission during a restart of the engine.

A control method of the oil pump control device comprises the steps of setting a driving pattern of a motor for an electric oil pump that supplies a hydraulic pressure to an automatic transmission, measuring an input speed of the automatic transmission, and correcting the driving pattern on the basis of the input speed and a hydraulic pressure in the electric oil pump.

BRIEF DESCRIPTION OF THE DRAWINGS

The above mentioned and other objects, features, advantages, technical and industrial significance of this invention will be better understood by reading the following detailed description of preferred exemplary embodiments of the invention, when considered in connection with the accompanying drawings, in which.

DETAILED DESCRIPTION OF PREFERRED EMBODIMENTS

The invention is based on the discovery that the hydraulic pressure supplied to an axle clutch designed as a friction coupling portion in an automatic transmission and the turbine speed during restart of an engine are closely related to each other. First of all, it will be described how the hydraulic pressure supplied to the axle clutch and the turbine speed during restart of the engine are related to each other. It is to be noted herein that the turbine speed means the output speed of a torque converter, that is, the input speed of the automatic transmission.

Figure 1:
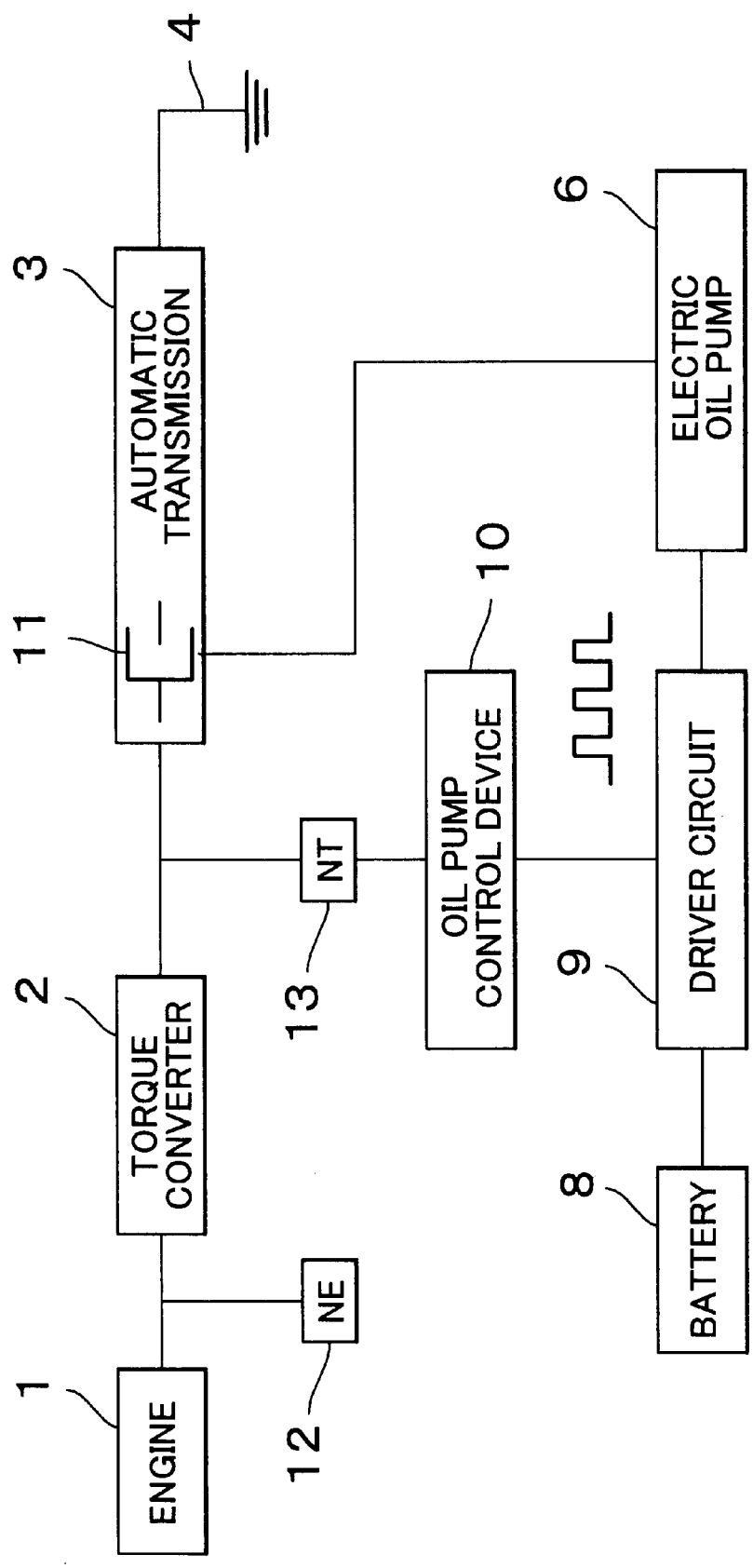
FIG. 1 is a schematic view of an engine torque transmission system extending from an engine to an output shaft of a vehicle according to an exemplary embodiment of the invention while the engine is being restarted.
Figure 5:
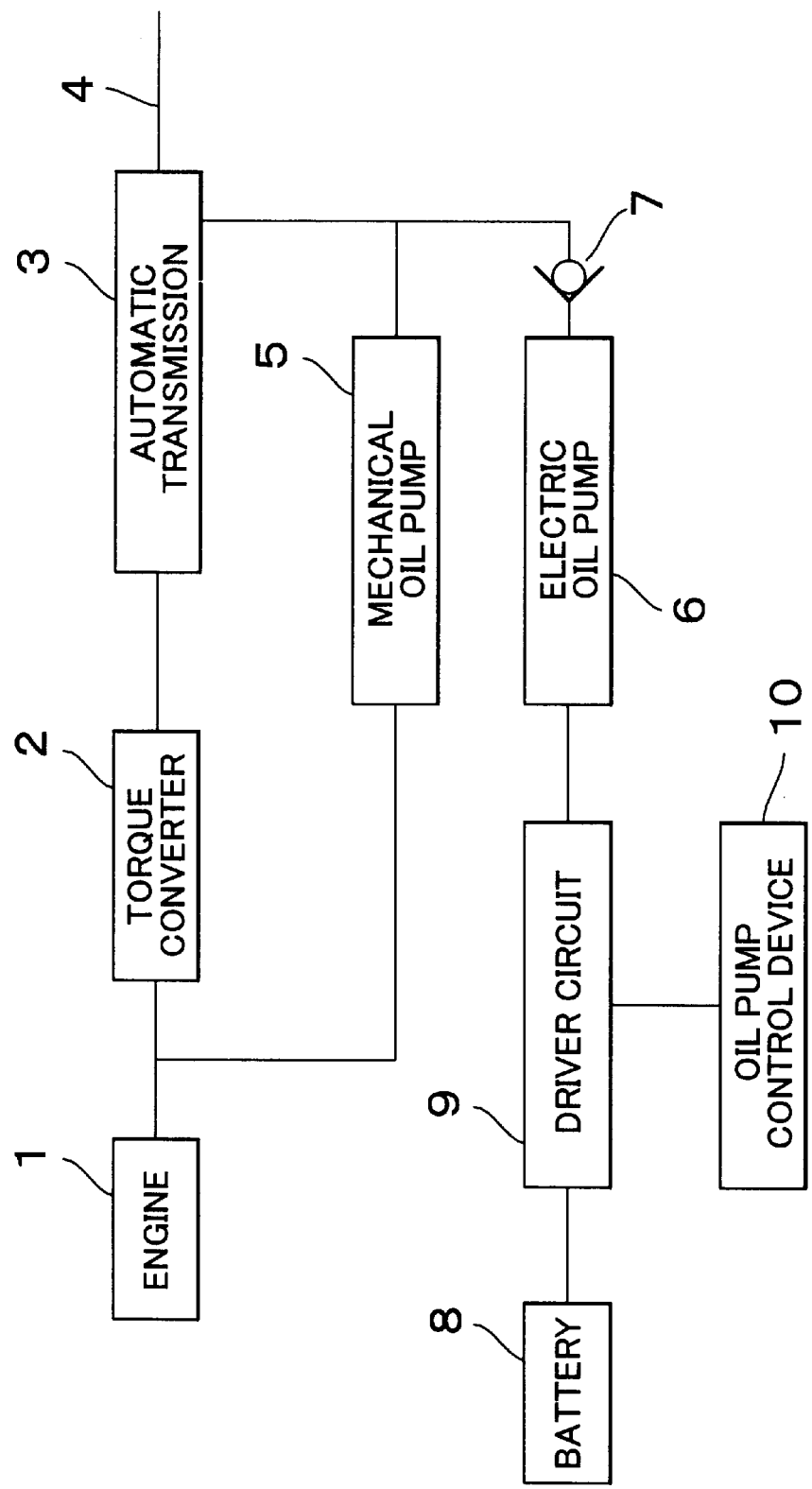
FIG. 5 is a diagram showing how an electric oil pump is arranged in relation to the other component members of an economy-running vehicle according to the related art.

FIG. 1 is a schematic view of an engine torque transmission system extending from an engine to an output shaft of a vehicle according to an exemplary embodiment of the invention while the engine is being restarted. The component members shown in FIG. 1 identical to those shown in FIG. 5 are simply denoted by the same reference numerals without being described again. An automatic transmission 3, shown in FIG. 1, includes an axle clutch 11, that is, a forward clutch or a backward clutch designed as a friction coupling portion. An electric oil pump 6 supplies a hydraulic pressure to the axle clutch 11. This hydraulic pressure is suitably controlled by a hydraulic pressure controller (not shown). A turbine speed monitor 13 for monitoring a turbine speed NT or an input speed of the automatic transmission 3 is provided. The turbine speed monitor 13 is coupled to an oil pump controller 10 designed as a controller. An engine speed monitor 12 for monitoring an engine speed NE or an output from an engine 1 is also provided. It is assumed herein that the oil pump control device is composed of the automatic transmission 3, the electric oil pump 6, and the oil pump controller 10.

A case where the vehicle is stopped upon fulfillment of one of a predetermined number of running conditions of the vehicle and then is restarted in an economy-running state in which the engine 1 is out of operation will now be taken into account. Referring to FIG. 1, an output shaft 4 of the vehicle is in a fixed state because the vehicle has been stopped. If the engine 1 is restarted in an economy-running state, an output from the engine 1 is input to the automatic transmission 3 via a torque converter 2. At this moment the electric oil pump 6 remains in operation, i.e., in the economy-running state, and generates a certain hydraulic pressure, which is supplied to the axle clutch 11 in the automatic transmission 3.

If the hydraulic pressure supplied from the electric oil pump 6 is sufficiently high, the axle clutch 11 designed as a friction coupling portion securely couples the input shaft and the output shaft in the automatic transmission 3 by a frictional force. Because the output shaft 4 of the vehicle is at rest, the input shaft of the automatic transmission 3, securely coupled to the output shaft 4 of the vehicle by a frictional force, also does not rotate. Even if the engine 1 runs, it undergoes a slip in the torque converter 2. For this reason, the turbine speed NT or the input speed of the automatic transmission 3 is zero in this case.

On the other hand, if the hydraulic pressure supplied from the electric oil pump 6 is not sufficiently high, the axle clutch 11, designed as the friction coupling portion, is unable to securely couple the input shaft and the output shaft in the automatic transmission 3 by a frictional force. A slip is then caused between the input shaft and the output shaft in the axle clutch 11. Accordingly, the turbine speed NT or the input shaft of the automatic transmission 3 indicates a speed reflecting the effect of the slip even if the output shaft 4 of the vehicle is at rest.

As described above, it has been revealed that the hydraulic pressure supplied to the axle clutch designed as the friction coupling portion in the automatic transmission and the turbine speed during restart of the engine are closely related to each other.

The hydraulic pressure in the electric oil pump 6 can thus be optimized by being controlled on the basis of a result obtained by monitoring the turbine speed NT. The optimal value of the hydraulic pressure supplied from the electric oil pump 6 will now be defined explicitly. The optimal value of the hydraulic pressure may be defined as being equal to or higher than a value that is obtained by gradually raising the hydraulic pressure until a slip is no longer caused in the axle clutch 11. However, the hydraulic pressure at the time when the slip ceases to be caused is extraordinarily high and threatens to cause a problem such as a shortened period of endurance of the electric oil pump 6. Taking into account that a certain amount of slip has no influence on actual driveability of the vehicle, the optimal value of the hydraulic pressure is defined herein as being equal to or higher than a hydraulic pressure allowing a slip of such an amount that the driveability of the vehicle remains unaffected. That is to say, the optimal value of the hydraulic pressure is a threshold, which is a turning point of the susceptibility of the driveability to a slip. The turbine speed corresponding to the threshold (hereinafter referred to as the threshold turbine speed) is monitored. The hydraulic pressure can be optimized by being controlled on the basis of a result thus obtained by monitoring the threshold turbine speed.

The foregoing contents will be described below with reference to FIG. 2, which is a graph showing a relation between turbine speed NT and hydraulic pressure. It is to be noted herein that the hydraulic pressure supplied from the electric oil pump 6 is equal to the threshold hydraulic pressure. A suitable state in which the turbine speed NT is equal to the threshold turbine speed is defined as a state C. If the hydraulic pressure supplied from the electric oil pump 6 is equal to or lower than the threshold hydraulic pressure, the hydraulic pressure supplied to the axle clutch 11 is not sufficiently high. As a result, a slip of such an amount as to cause a problem regarding the driveability of the vehicle occurs, so that the turbine speed NT assumes a value higher than the threshold turbine speed. This state in which an extraordinary amount of slip is caused is defined as a state A. To make a shift from the state A to the suitable state C, it is appropriate that the hydraulic pressure supplied from the electric oil pump 6 be raised until the threshold turbine speed is reached while the turbine speed NT is being monitored.

On the contrary, if the hydraulic pressure supplied from the electric oil pump 6 is equal to or higher than the threshold hydraulic pressure, the axle clutch 11 is supplied with a hydraulic pressure that is quite sufficient. From the standpoint of the driveability of the vehicle, this hydraulic pressure unnecessarily inhibits a slip from being caused. Accordingly, no slip is caused at all in the case where a still higher hydraulic pressure is supplied. At this moment the turbine speed NT assumes a value lower than the threshold turbine speed. If the hydraulic pressure is extraordinarily high, the turbine speed NT is zero. This state in which the hydraulic pressure is extraordinarily high is defined as a state B. To make a shift from the state B to the suitable state C, it is appropriate that the hydraulic pressure supplied from the electric oil pump 6 be lowered until the threshold turbine speed is reached while the turbine speed NT is being monitored.

The hydraulic pressure supplied to the automatic transmission 3 can thus be optimized by being controlled on the basis of a result obtained by monitoring kinetic characteristics of the engine torque transmission system extending from the engine to the output shaft of the vehicle during restart of the engine, for example, by monitoring the turbine speed NT or the input speed of the automatic transmission 3.

Figures 3A, 3B:
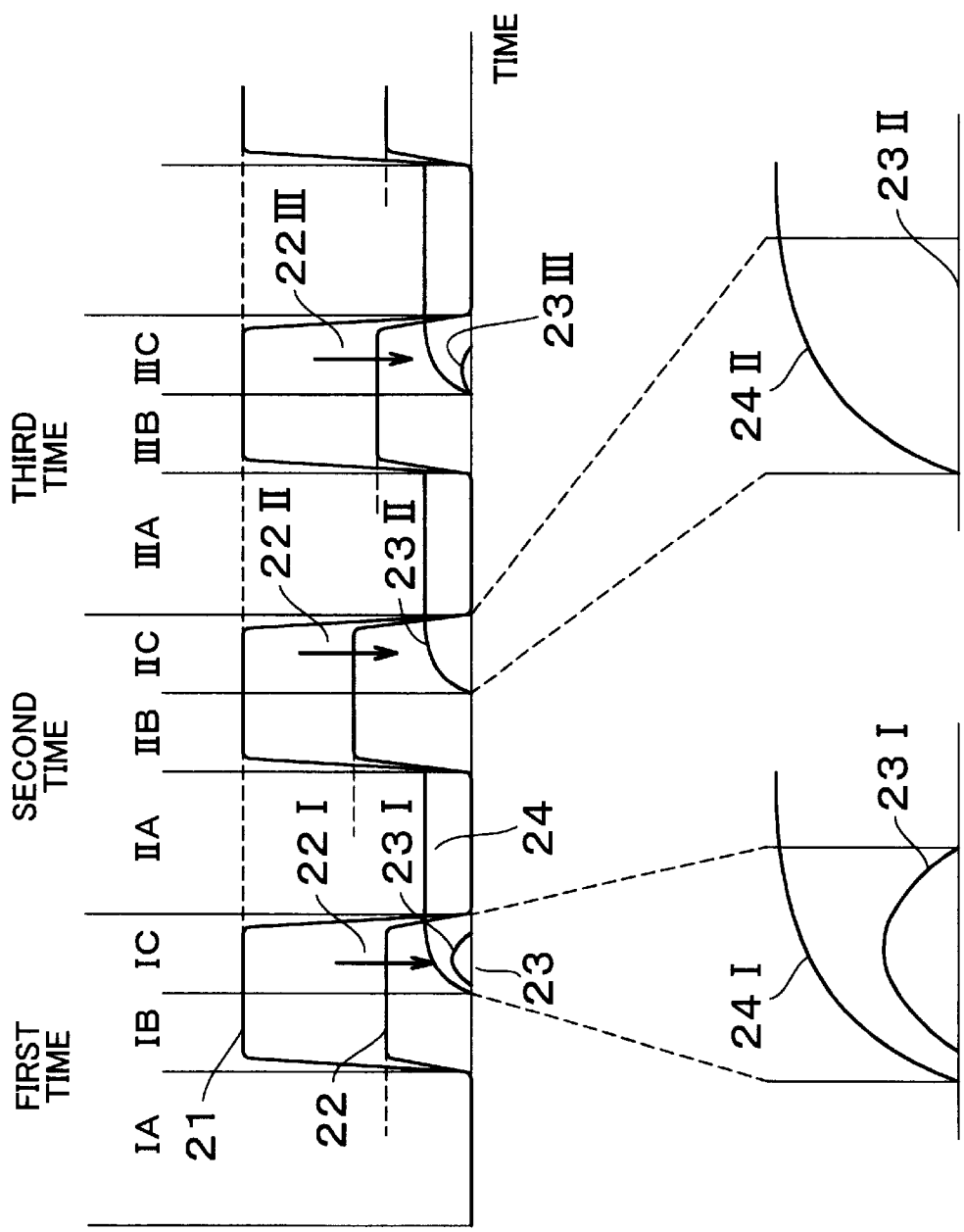
FIG. 3a is a general schematic view of processes in which an oil pump control device according to the exemplary embodiment of the invention optimizes hydraulic pressure.
FIG. 3b is a partially enlarged schematic view of processes in which the oil pump control device according to the exemplary embodiment of the invention optimizes hydraulic pressure.

FIGS. 3a and 3b show processes in which the oil pump control device of the automatic transmission according to the exemplary embodiment of the invention optimizes the hydraulic pressure. In FIGS. 3a and 3b, while the axis of abscissa represents time, the axis of ordinate represents a hydraulic pressure 21 output from the electric oil pump according to the related art, a hydraulic pressure 22 (22a–22c) output from the electric oil pump 6, a turbine speed 23 (23a–23c), and an engine speed 24 (24a–24b). The time axis in each section of FIG. 3a sequentially indicates the state A in which the engine 1 is running normally after having been started, the state B in which the engine 1 is out of operation, and the state C in which the engine 1 has been restarted prior to completion of the starting process thereof. Optimization of the hydraulic pressure is updated every time the engine 1 is restarted. The description will now be made in a time-series manner from the left along the time axis shown in FIG. 3a. The Roman numeral of each reference symbol of IA to IIIC in FIG. 3a denotes how many times the engine 1 has been operated. That is, the normal running state of the engine 1 after completion of the first starting process thereof is denoted by (IA).

When operated for the first time (IA) as shown on the leftmost side along the time axis in FIG. 3a, the engine 1 is running while driving the mechanical oil pump 5. Therefore, the electric oil pump 6 is out of operation and does not generate a hydraulic pressure. However, since the electric oil pump 6 starts operating as soon as the engine 1 enters an economy-running state, a condition for driving the electric oil pump 6 is set in advance. The hydraulic pressure output from the electric oil pump 6 is related to the speed of a DC motor for driving the pump. The hydraulic pressure output from the electric oil pump 6 can thus be set by determining a voltage output from a driver circuit 9 for supplying the DC motor with electric power from a battery 8. The effective voltage supplied to the DC motor can be set, for example, by converting a DC voltage output from the battery 8 into pulses by means of a chopper and setting a duty ratio of the pulses appropriately. The drive duty ratio of the electric oil pump 6 is thus set in the state (IB).

If the engine 1 is then stopped and enters the state (IB), the electric oil pump 6 is operated and generates a hydraulic pressure 22a corresponding to the drive duty ratio that has been set. The engine 1 is in the economy-running state at this moment.

If a signal for restarting the engine 1 is then issued, the engine 1 comes out of the economy-running state and is restarted. FIG. 3b, a partially enlarged view of FIG. 3a shows how a turbine speed 23a and an engine speed 24a change in this state (IC). The state (IC) represents a transitional period in which the engine speed 24a rises after restart of the engine 1 and settles to a sufficiently stable state. In this period as well, the electric oil pump 6 is in operation. The turbine speed 23a is measured when the engine 1 is in this state (IC). At this moment it is necessary to confirm that a throttle is fully closed in the transitional period. The necessity for such confirmation results from the fact that monitoring the turbine speed NT alone may lead to an erroneous determination on an amount of slip of the axle clutch 11 due to a torsion occurring in a drive system when the throttle is open. The turbine speed 24a is measured throughout the period in which the engine 1 is in the state (IC). A maximum or central value of the turbine speed 24a can be regarded as a turbine speed corresponding to the hydraulic pressure 22a of the electric oil pump 6.

If a sufficiently high engine speed is reached, namely, if the transitional period ends to complete the starting process of the engine 1, the engine 1 drives the mechanical oil pump 5. Thus, the electric oil pump 6 comes out of operation. This state is defined as a second-time state (IIA). At this stage, measurement of the turbine speed 23a through the whole period in the preceding state (IC) is completed. Thus, on the basis of comparison with the threshold turbine speed and reference to the relation between the turbine speed NT and hydraulic pressure as described with reference to FIG. 2, a hydraulic pressure for realizing the threshold turbine speed is obtained. A drive duty ratio of the voltage supplied to the electric oil pump 6 is calculated as a value required for generation of the hydraulic pressure. The drive duty ratio set in the first-time state (IA) is then updated by the drive duty ratio thus calculated for subsequent restart of the engine 1.

If the engine 1 passes through the state (IIA) and enters the economy-running state (IIB) for the second time, the electric oil pump 6 operates at the drive duty ratio updated in the state (IIA) and generates a hydraulic pressure 22b. If the engine 1 is then restarted for the second time, the turbine speed NT is measured again while the engine 1 is in the state (IIC). If the restarting process of the engine 1 is then completed for the second time, the electric oil pump 6 is stopped again. This state is defined as a third-time state (IIIA). When the engine 1 is in the third-time state (IIIA), the turbine speed NT measured when the engine 1 is in the second-time state (IIC) is compared with the threshold turbine speed. The drive duty ratio is then updated by still another value.

As described above, the turbine speed NT during a certain process of restarting the engine 1 is measured and compared with the threshold turbine speed, and the drive duty ratio of the electric oil pump 6 is updated. When the engine 1 is restarted next time, another hydraulic pressure can be generated on the basis of the updated drive duty ratio. By sequentially updating the hydraulic pressure to be generated by the electric oil pump 6, it becomes possible to perform a learning control and optimize the hydraulic pressure controlled by the oil pump control device of the automatic transmission 3.

FIG. 3a shows, as a reference, the hydraulic pressure 21 output from the electric oil pump 6 according to the related art in which learning control is not performed. As is apparent from FIG. 3a, the hydraulic pressure 21 remains at an extraordinarily high constant value no matter when the engine 1 is restarted.

Figure 4:
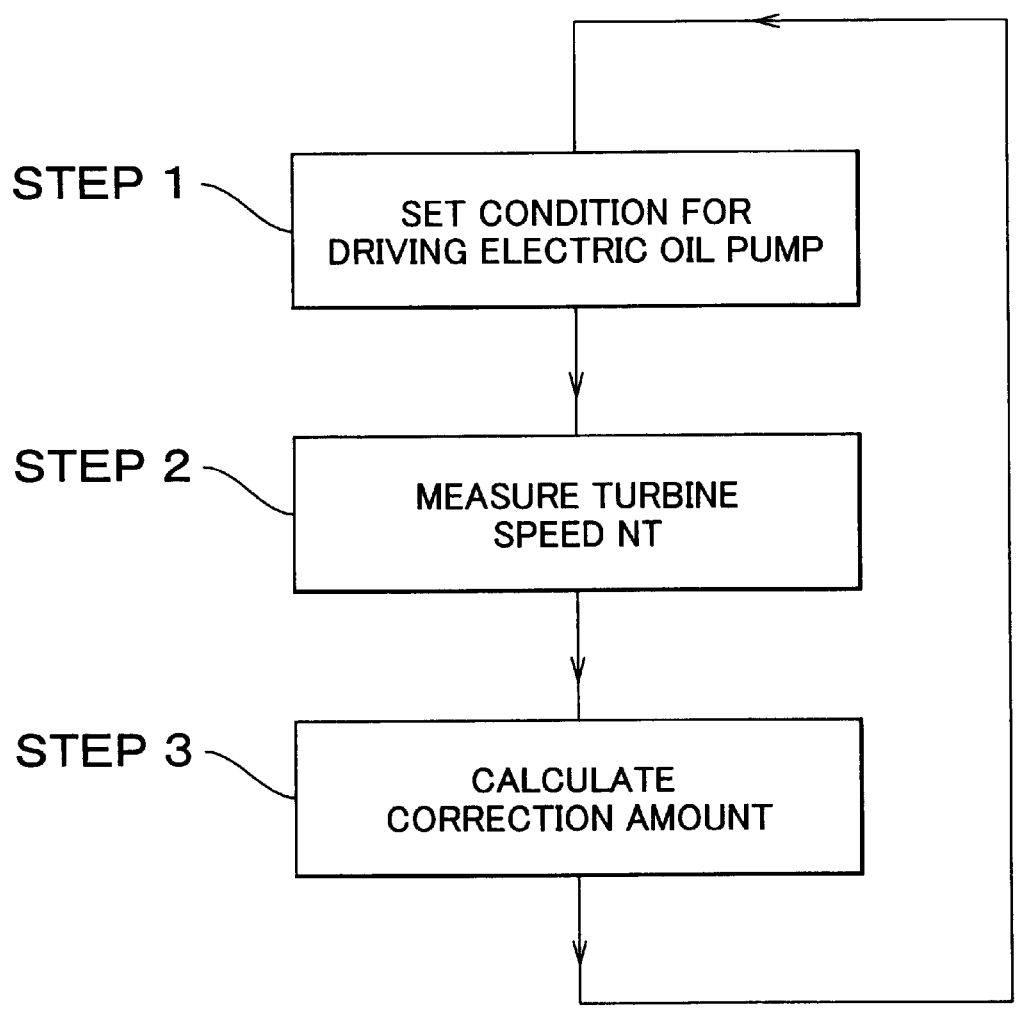
FIG. 4 is a flowchart showing procedures of optimizing hydraulic pressure by the oil pump control device according to the exemplary embodiment of the invention.

FIG. 4 is a flowchart of procedures of updating the condition for driving the electric oil pump 6. These procedures are the most essential among a series of control procedures of optimizing the hydraulic pressure in the oil pump control device in the automatic transmission 3 according to the exemplary embodiment of the invention described with reference to FIGS. 3a and 3b.

STEP 1 represents a procedure of setting the condition for driving the electric oil pump 6. In STEP 1, the drive duty ratio of the electric oil pump 6 is set, for example, by reference to a relation between the generated hydraulic pressure and the drive duty ratio of the electric motor for driving the electric oil pump 6.

STEP 2 represents a procedure of measuring the turbine speed NT or the input speed of the automatic transmission 3. Because the vehicle is generally equipped with the turbine speed monitor 13, it is possible to make use of an output from the turbine speed monitor 13, whereby the necessity of providing the vehicle with an additional sensing portion is eliminated. The turbine speed NT is measured for a period which starts when the engine 1 in the economy-running state starts running in response to the issuance of a signal for restarting the engine 1 and which ends when the engine speed settles to a sufficiently stable value. The throttle must be fully closed to prevent an erroneous determination on an amount of slip of the axle clutch 11.

Figure 2:
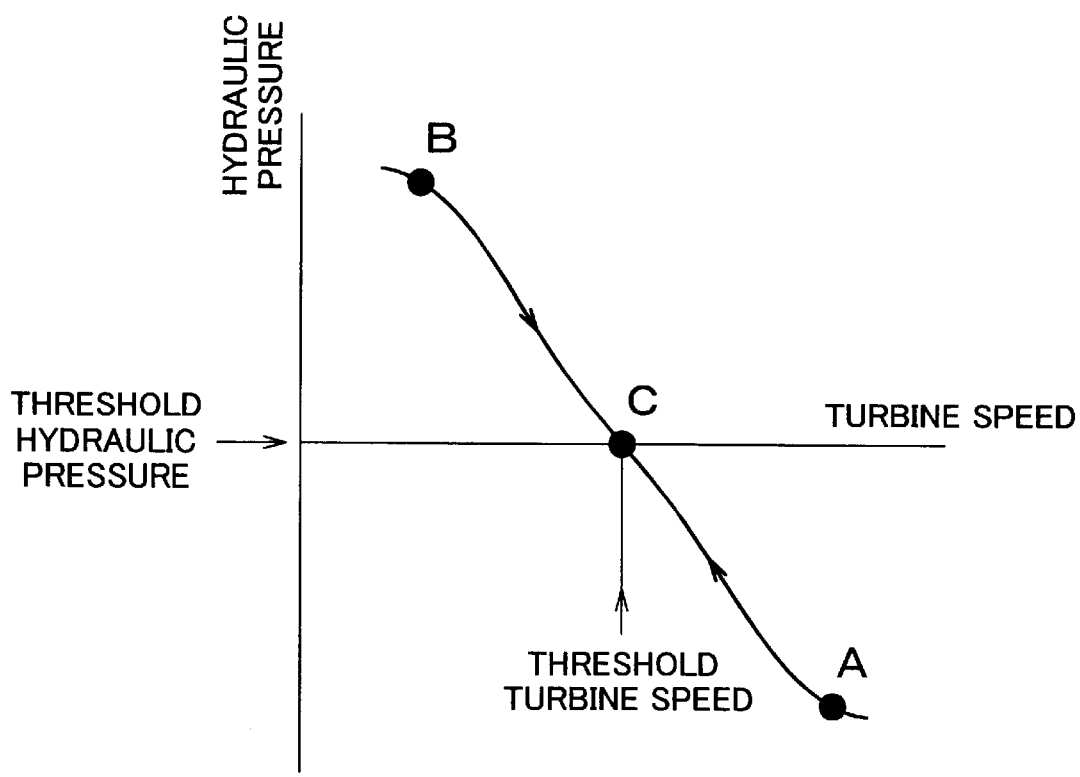
FIG. 2 is a graph showing a relation between turbine speed NT and hydraulic pressure according to the exemplary embodiment of the invention.

STEP 3 represents a procedure of calculating a correction amount for the hydraulic pressure in respect of the turbine speed NT obtained in STEP 2 on the basis of the relation between the turbine speed NT and hydraulic pressure shown in FIG. 2 and calculating a correction amount for the drive duty ratio of the electric oil pump 6 which is necessitated to generate the corrected hydraulic pressure.

The procedure in STEP 1 is resumed after the procedure in STEP 3 has been performed. The condition for driving the electric oil pump 6 is reset on the basis of the correction amount for the drive duty ratio calculated in STEP 3.

In the foregoing description of the exemplary embodiment of the invention, the turbine speed NT or the input speed of the automatic transmission 3 during restart of the engine 1 is handled as the kinetic characteristics representative of the coupling characteristics of the axle clutch 11 acting as a friction coupling element. However, the invention can also be implemented by adopting other kinetic characteristics of the engine torque transmission system extending from the engine to the output shaft 4 of the vehicle during restart of the engine 1, such as acceleration of the output shaft 4, as long as adoption of the kinetic characteristics makes it possible to confirm whether a shock occurring in the change-gear mechanism during the coupling of the friction coupling element such as the axle clutch 11 causes a problem in terms of the driveability of the vehicle.

Although learning control of the electric oil pump 6 has been described as a method of updating the drive duty ratio as a determinant of the effective voltage supplied to the DC motor for driving the electric oil pump 6, the invention can also be implemented by other generally employed methods of changing voltage and current.

The foregoing description of the exemplary embodiment of the invention has been made principally as to the close relation between the hydraulic pressure supplied to the axle clutch or the friction coupling portion in the automatic transmission and the turbine speed during restart of the engine, and as to optimization of the hydraulic pressure supplied to the automatic transmission through the updating of the hydraulic pressure control characteristics based on the kinetic characteristics of the engine torque transmission system extending from the engine to the output shaft of the vehicle during restart of the engine and through the monitoring of the hydraulic pressure. If these standpoints are shifted, optimization of the hydraulic pressure supplied to the automatic transmission can also be construed as optimization through a learning control of the hydraulic pressure based on differences or aging-based changes in the performance of the motor for driving the electric oil pump, the output voltage of the driver circuit, the clearance of valves disposed in the automatic transmission or the hydraulic pressure controller thereof, and the like. Accordingly, the invention can be implemented, for example, by changing the hydraulic pressure control characteristics on the basis of fluctuant factors affecting the hydraulic pressure such as aging of the electric oil pump.

The oil pump control device for the automatic transmission according to the invention is designed to update the hydraulic pressure control characteristics of the electric oil pump on the basis of the kinetic characteristics of the engine torque transmission system extending from the engine to the output shaft of the vehicle during restart of the engine and to thereby optimize the hydraulic pressure supplied to the automatic transmission. It is preferred that the kinetic characteristics of the engine torque transmission system be defined as the input speed of the automatic transmission. Also, it is preferred that the kinetic characteristics captured during restart of the engine in a certain period be used to update the hydraulic pressure control characteristics when the engine is restarted next time. It is to be noted herein that the input speed of the automatic transmission or the like depends on the coupling characteristics of the friction coupling element during restart of the engine and that the coupling characteristics are determined by the hydraulic pressure supplied to the automatic transmission. The hydraulic pressure supplied to the automatic transmission can thus be optimized by updating the hydraulic pressure control characteristics of the electric oil pump on the basis of the kinetic characteristics of the engine torque transmission system and performing learning control of the hydraulic pressure control characteristics. As a result, the invention succeeds in ensuring that an optimal hydraulic pressure is output from the electric oil pump from the standpoint of operation of the friction coupling element and the change-gear mechanism.

The controllers (e.g., the oil pump controller 10 and the hydraulic pressure controller) of the illustrated exemplary embodiments are implemented as one or more programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An oil pump control device for an automatic transmission, comprising:
    an electric oil pump that is electrically driven to supply the automatic transmission with a hydraulic pressure; and
    a controller that updates the hydraulic pressure generated by the electric oil pump based on kinetic characteristics of a torque transmission system during a start of an engine that is stopped automatically upon fulfillment of one of a predetermined number of running conditions of a vehicle and optimizes the hydraulic pressure by controlling the hydraulic pressure supplied to the automatic transmission based on the hydraulic pressure updated during a restart of the engine.

2. The oil pump control device according to claim 1, wherein an input speed of the automatic transmission is included as the kinetic characteristics.

3. The oil pump control device according to claim 2, further comprising:
    a turbine speed monitor that monitors the input speed of the automatic transmission.

4. The oil pump control device according to claim 1, wherein the controller controls the electric oil pump that supplies the automatic transmission with the hydraulic pressure such that a difference between input speed and output speed of the automatic transmission falls within a predetermined range so as to optimize the hydraulic pressure.

5. The oil pump control device according to claim 1, wherein the controller uses the kinetic characteristics obtained during operation of the electric oil pump in a certain period when the engine is restarted next time of the certain period.

6. An oil pump control device for an automatic transmission, comprising:
    an electric oil pump that is electrically driven to supply the automatic transmission with a hydraulic pressure; and
    a controller that updates the hydraulic pressure generated by the electric oil pump based on aging of a hydraulic system of the electric oil pump in an engine that is stopped automatically upon fulfillment of one of a predetermined number of running conditions of a vehicle and optimizes the hydraulic pressure by controlling the hydraulic pressure supplied to the automatic transmission based on updated hydraulic pressure.

7. A control method of an oil pump control device for an automatic transmission, comprising the steps of:
    setting a driving pattern of a motor for an electric oil pump that supplies a hydraulic pressure to an automatic transmission;
    measuring an input speed of the automatic transmission; and
    correcting the driving pattern based on the input speed of the automatic transmission and the hydraulic pressure generated by the electric oil pump.

8. The method according to claim 7, wherein the oil pump control device repeatedly performs the control method.

9. The method according to claim 7, wherein the electric oil pump is operated according to the driving pattern such that a difference between input speed and output speed of the automatic transmission falls within a predetermined range.

10. The method according to claim 7, wherein the driving pattern of the motor is set as a duty ratio.

11. The method according to claim 7, wherein the driving pattern of the motor is set by variable-voltage control.

12. The method according to claim 7, wherein the driving pattern of the motor is set by variable-current control.

13. The method according to claim 7, wherein the input speed of the automatic transmission is measured if a throttle is fully closed.

* * * * *